(12) United States Patent  
Bhattacharya et al.

(10) Patent No.: US 12,254,000 B2  
(45) Date of Patent: Mar. 18, 2025

(54) SYSTEM AND METHOD FOR BLOCKCHAIN DATA TRANSFERS

(71) Applicant: Wells Fargo Bank, N.A., San Francisco, CA (US)

(72) Inventors: Paromita Bhattacharya, Changannagar (IN); Prabahar Natarajan, Cumming, GA (US); Itiernajerha Jewel Oghoghomeh, Gastonia, NC (US); Niraj Bharatkumar Thakar, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/192,184

(22) Filed: Mar. 29, 2023

(65) Prior Publication Data

US 2024/0330271 A1 Oct. 3, 2024

(51) Int. Cl.
| | |
|---|---|
| G06F 16/23 | (2019.01) |
| G06F 9/54 | (2006.01) |
| G06F 11/14 | (2006.01) |
| G06F 16/27 | (2019.01) |
| G06F 21/60 | (2013.01) |
| H04L 1/00 | (2006.01) |

(52) U.S. Cl.
CPC .......... *G06F 16/2379* (2019.01); *G06F 9/547* (2013.01); *G06F 11/1458* (2013.01); *G06F 16/27* (2019.01); *G06F 21/602* (2013.01); *H04L 1/004* (2013.01); *G06F 2201/84* (2013.01)

(58) Field of Classification Search
CPC .... G06F 16/2379; G06F 16/27; G06F 11/145; G06F 21/602; G06F 9/547; G06F 2201/84

See application file for complete search history.

(56) References Cited

U.S. PATENT DOCUMENTS

| | | |
|---|---|---|
| 10,163,080 B2 | 12/2018 | Chow et al. |
| 10,340,038 B2 | 7/2019 | Witchey |

(Continued)

OTHER PUBLICATIONS

Hasan, H., et al., "Proof of Delivery of Digital Assets using Blockchain and Smart Contracts", Journal of Latex Class Files, vol. 14, No. 8, Aug. 2015, (Aug. 2015), 9 pgs.

*Primary Examiner* — Samir W Rizk  
(74) *Attorney, Agent, or Firm* — SCHWEGMAN LUNDBERG & WOESSNER, P.A.

(57) ABSTRACT

A digital distributed ledger-based system provides for receiving, via a first application, a first data transmission record representative of a transmission of a file by the first application, and for receiving, via a second application, a first data receipt record representative of a receipt of the file by the second application. The digital distributed ledger-based system also provides for storing the first data transmission record and the first data receipt record in the digital distributed ledger. The digital distributed ledger immutably stores the first data transmission record and the first data receipt word record. The digital distributed ledger-based system additionally provides for determining that the transmission of the file has occurred correctly by retrieving the first data transmission record and the first data receipt record from the digital distributed ledger and by comparing the first data transmission record to the first data receipt record.

20 Claims, 4 Drawing Sheets

(56) References Cited

U.S. PATENT DOCUMENTS

| | | |
|---|---|---|
| 11,032,057 B2 | 6/2021 | Xia |
| 11,188,907 B1 | 11/2021 | Vijayvergia et al. |
| 11,188,977 B2 | 11/2021 | Youb et al. |
| 11,301,452 B2 | 4/2022 | Chan et al. |
| 11,501,370 B1 * | 11/2022 | Paya ................. G06Q 20/3676 |
| 2016/0283920 A1 | 9/2016 | Fisher et al. |
| 2017/0046689 A1 | 2/2017 | Lohe et al. |
| 2017/0132625 A1 | 5/2017 | Kennedy |
| 2017/0236102 A1 | 8/2017 | Biton |
| 2017/0236120 A1 | 8/2017 | Herlihy et al. |
| 2017/0286951 A1 | 10/2017 | Ignatchenko et al. |
| 2018/0276625 A1 * | 9/2018 | Saye ................. G06Q 20/3825 |
| 2020/0104836 A1 * | 4/2020 | Coburn ................. G06Q 20/36 |
| 2020/0167931 A1 * | 5/2020 | Ge ........................ G06T 7/0004 |
| 2020/0287898 A1 * | 9/2020 | Weaver ................ H04L 9/3231 |
| 2020/0394578 A1 * | 12/2020 | Taggart ................ G06Q 20/401 |
| 2024/0119407 A1 * | 4/2024 | Reczek ............. G06Q 10/0838 |
| 2024/0127233 A1 * | 4/2024 | Doney ................... G06Q 20/02 |

* cited by examiner

SYSTEM AND METHOD FOR BLOCKCHAIN DATA TRANSFERS

TECHNICAL FIELD

The present disclosure generally relates to blockchains, and more specifically to blockchain data transfers.

BACKGROUND

Certain computing systems process and transfer data. For example, a first application processes certain data and then transfers the data for use by a second application. The second application receives the data and acknowledges receipt, for example, by transmitting an acknowledgement (ACK) back to the first application. The first application can also transfer the data by calling an application programming interface (API) that sends the data to the second application or by using a data store to store data for retrieval by the second application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The techniques described herein solve various technical problems such as more efficiently transferring data between applications in a more reliable and verifiable manner without incurring an acknowledgement (ACK) message overhead. In certain examples, data communication between applications includes using a distributed ledger to annotate certain data communication events and/or to record certain data transfers. By using the distributed ledger as further described below, the techniques described herein enable various types of applications, including disparate applications (e.g., applications that are not explicitly designed to work with each other) to transfer information between each other while a record of data transfers is maintained in an immutable and distributed manner.

In some examples, various applications may be used as part of a process, such as a financial transactions process, a supply chain process, an e-commerce process, and so on. A first application will produce a result, such as a file, and then communicate the file to a second application. The second application will modify the file and communicate the file to a third application, and so on. The techniques described herein capture each data communication event in the distributed ledger, and in some examples, additionally capture the data communicated by each application. Accordingly, a record of the data transfers and data used is kept immutably in a distributed manner without having to transmit acknowledgement receipts (e.g., ACKs) between applications. Further, the distributed ledger can also be used to verify that data transfers took place, a date and a time for each transfer, the originator and the receiver of each transfer, as well as the data being transferred.

In other examples, the first application may modify a data store (e.g., database) directly instead of transmitting a file, the second application may then used the modified data store to further process and store the data for a third application, and so on. Similarly, the first application may communicate data to the second application via an application programming interface (API) provided to deliver data to the second application. Regardless of data transfer types used (e.g., file transfers, writes to the data store, API-based transfers, and so on), the techniques described herein provide for the capture of the data transfer event in the distributed ledger. The distributed ledger can then be used to provide data transfer receipts, verify dates and times for data transactions, provide for rollbacks of data transactions, and in some examples, provide for data backups, among other uses further described below.

Figure 1:
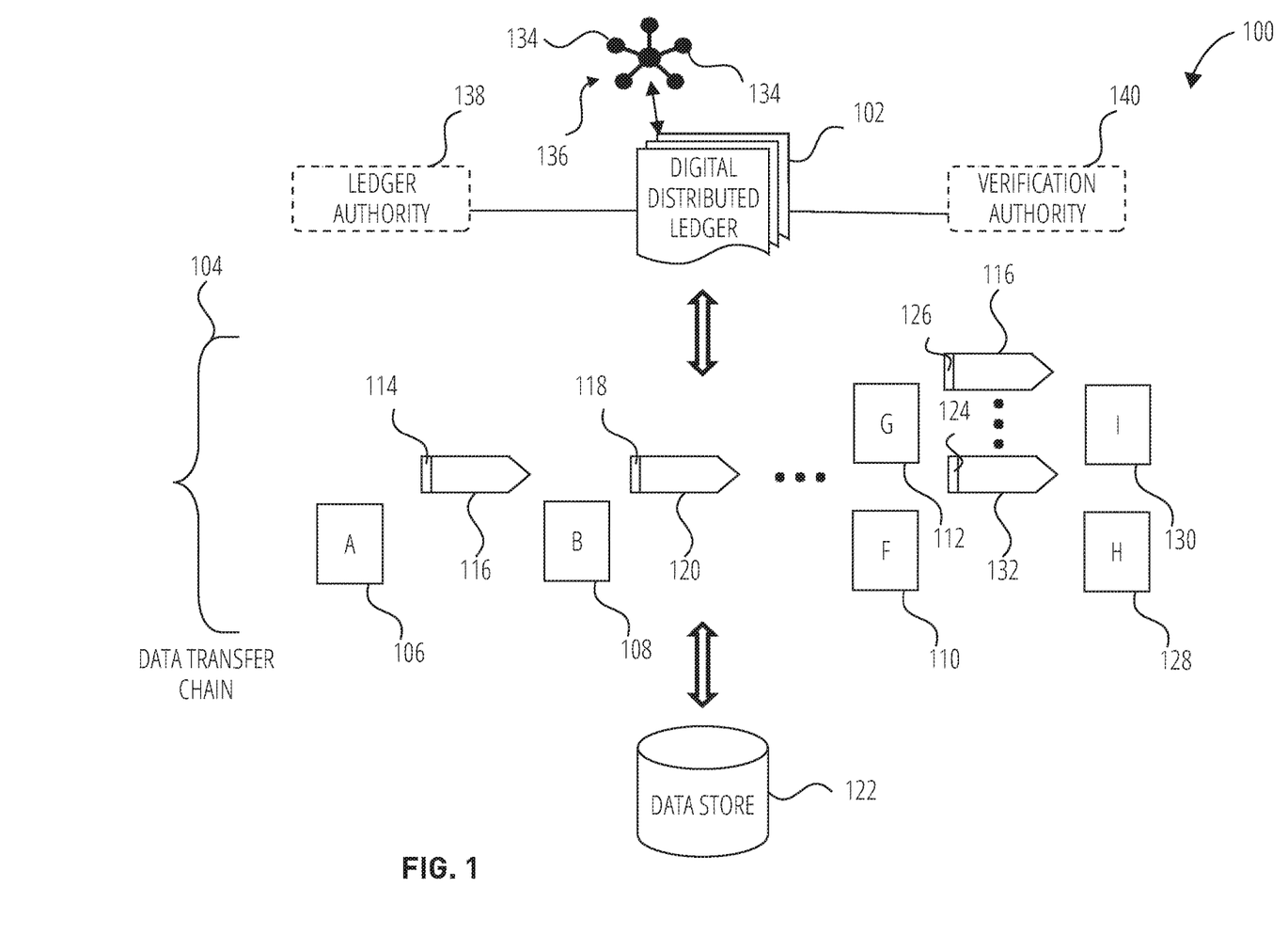
FIG. 1 illustrates a digital distributed ledger-based system that includes a digital distributed ledger used record a data transfer chain, according to some embodiments.

FIG. 1 illustrates an example digital distributed ledger-based system 100 that includes a digital distributed ledger 102 used record a data transfer chain 104, according to some embodiments. The data transfer chain 104 provides for automation of a process, such as a financial process. For example, a spreadsheet application employs custom code for processing certain loan applications and produces a spreadsheet file. The spreadsheet file is then read by an anonymizer application that creates anonymized database records. The anonymized database records are then read by a loan procurement application that can provide the anonymized data to various loan providers via APIs, resulting in various loan offers, which may be provided to customers via email. Each link in the data transfer chain 104, e.g., data transfer between applications, is recorded in the digital distributed ledger 102. The recordation of the data communication is performed by the transmitting application, the receiving application or both. The recordation can include identification information of the application and/or user that transmitted the data, identification information of the application and/or user that received the data, date and times of data transmission, date and times of data receipt, and/or the actual data transmitted and received. Accordingly, the digital distributed ledger 102 can be used in lieu of an acknowledgement of receipt (ACK) message, but additionally can be used to verify details of the data communication and provide for data backups, among other uses further described below.

In the depicted example, the digital distributed ledger-based system 100 is shown as having various applications (e.g., software applications) A 106, B 108, F 110, G 112, H 128, I 130. The applications A 106, B 108, F 110, G 112, H 128, I 130 can include any application, such as applications used by financial institutions (e.g., loan processing applications, bill payment applications, credit processing applications, fund transfer applications, and so on), by supply chain entities (e.g., inventory control applications, invoicing applications, shipping applications, and so on), by e-commerce applications (e.g., online sales applications, parts procurement applications, and so on). The applications A 106, B 108, F 110, G 112, H 128, I 130 can further include email clients, word processing applications, spreadsheet-based applications, and other similar more general purpose office applications.

The digital distributed ledger-based system 100 uses blockchain techniques via the digital distributed ledger 102 to provide for a record of data transfers (e.g., file-based data transfers, data store-based data transfers, application programming interface-based data transfers) that enable the creation of a distributed and immutable record of data transfer "chains" by certain applications and/or users. Records of the data transfer chain 104 can then be used, for example, to verify that certain data has been communicated, to verify identities of applications and/or users that communicated the data (e.g., data lineage verification and data ownership verification), to provide for enhanced data security, and to provide for improved data modification tracking.

In the depicted embodiment, data in the data transfer chain 104 is initially created at application A 106, and is then communicated to application B 108. Application B 108 in turn processes the received data and communicates processed data to other applications down the chain, such as applications F 110 and G 112, and so on. More specifically, the application A 106 can perform some data processing that results in the file 114. The file 114 is a collection of data stored in a unit identified by a filename and can be any type of computing system file. For example, a spreadsheet program can process certain numeric inputs and create the file 114 as output. The application A 106 then transmits the file 114 for use by application B 108 using a file communications system 116. The file communications system 116 can apply synchronous and/or asynchronous data communications techniques, including secure file transfer protocol (sFTP) techniques, message oriented middleware (MOM) techniques, server-based file sharing techniques (e.g, network file sharing), hypertext transfer protocol secure (HTTPS) techniques, secure email-based techniques, and so on, to communicate the file 114 down the data transfer chain 104.

The application A 106 and/or the file communication system 116 will add a data transmission record to the digital distributed ledger 102 after the file 114 is transmitted, thus recording a start of the data transfer chain 104 in the digital distributed ledger 102. In certain examples, the data transmission record includes a date of file transmission, a time of file transmission, a unique identifier for a user transmitting the file 114, a unique identifier that identifies the application A 106 used to transmit the file, the application name and version, organization that is using the application, any intended recipients (e.g. entities, users, and/or applications), or a combination thereof. In some examples, a one-way hash function, such as a message-digest 5 algorithm (MD5), a secure hash 1 algorithm (SHA1), a secure hash algorithm 256 (SHA256), and so on, is applied to the data transmitted (e.g., the file) to produce a one-way hash value (e.g., 32 character-long value, 64 character-long value). The one-way hash value identifies the data transmitted. Accordingly, the one-way hash value is stored as part of the data transmission record. Further, in some examples, an error correction code (ECC), such as a Hamming ECC, is computed for the data transmitted (e.g, the file) and stored in the data transmission record. The ECC can then be used to correct data transmission errors and/or to verify that data transmission took place.

The application B, upon receipt of the file 114, will add a data receipt record to the digital distributed ledger 102, thus adding another record of the data transfer chain 104 in the digital distributed ledger 102. For example, the application B 108 will record a date of receipt of the file, a time of receipt of the file, user(s) receiving the file 114, a unique identifier that identifies the receiving application (e.g., application B 108), the receiving application name and version, the organization that is using the receiving application, or a combination thereof. In some examples, the data receipt record additionally includes a one-way hash value of the data (e.g., file 114) that was received, and/or an ECC (e.g., Hamming ECC) calculated for the received data. In certain examples, the distributed ledger is additionally used to store a one or more copies of the file 114 (e.g., a transmitted file copy and received file copy), which may be encrypted when stored in the digital distributed ledger 102, for added security and anonymization purposes.

Once the file 114 is received, an application, such as the application B 108, can access data in the file 114 and further manipulate the data to create new processed data. For example, the file 114 is read by the application B 108 to produce certain data 118. As mentioned earlier, data communication between applications includes communications via data stores. In the depicted example, the application B 108 uses a database system 120 (e.g., relational database system, NoSQL database system, object-oriented database system, cloud-based database system, and so on), to access a data store 122 to store the data 118. The application B 108 and/or the database system 116 will then store a data transmission record in the digital distributed ledger 102 after the data is communicated to the data store 122, further adding yet another record of the data transfer chain 104 to the digital distributed ledger 102.

In certain examples, the data transmission record includes a date of storage of the data 118, a time of storage, a unique identifier for a user storing the data 118, a unique identifier that identifies the application storing the data (e.g., application B 108), the application name and version, an organization that is using the application, any intended recipients (e.g, entities, users, and/or applications), or a combination thereof. In some examples, the data transmission record additionally includes a one-way hash value of the data 118 that was transmitted into the data store 122, and/or an ECC (e.g., Hamming ECC) calculated for the transmitted data. Further, in some examples, the digital distributed ledger 102 is additionally used to store a transmitted copy of the data 118, which may be encrypted for added security and anonymization purposes.

The data store 122 will record a data receipt record in the digital distributed ledger 102, for example, by using automatic database triggers, when the data 118 is written into the data store 122. For example, the data store 122 will record in the digital distributed ledger 102 a date of storage for the data, a time of storage for the data, a unique identifier that identifies the data store 122, the data store name and version, an organization that is using the data store, an user account used to write to the data store 122, or a combination thereof, thus additionally adding another record of the data transfer chain 104 to the digital distributed ledger 102. In some examples, the data receipt record additionally includes a one-way hash value of the data that was received by the data store 122, and/or an ECC (e.g., Hamming ECC) calculated for the received data.

In the depicted example, applications F 110 and G 112 access the data 118 via the data store 122 and further process the data 118 to result in processed data 124 and 126, respectively. Indeed, the data transfer chain 104 can include branches, such as via applications F 110 and G 112, where the same input data (e.g., data 118) is used by two or more applications and each application then produces further data, such as data 124, 126, for transmission to other applications, such as applications H 128 and I 130. In the depicted example, applications F 110 and G 112 read the data 118 from the data store 122 and each application F 110 and G 112 then records the reading of the data 118 in the digital distributed ledger 102 via a respective data receipt record. For example, the applications F 110 and G 112 will record in the digital distributed ledger 102 a date of reading data from the data store 122, a time of reading the data from the data store 122, a unique identifier that identifies the data store 122 used for reading the data, the data store name and version, and organization that is using the data store, a user account used to read the data store 122, or a combination thereof, thus additionally adding more records of the data transfer chain 104 to the digital distributed ledger 102. The data transmission records additionally includes a one-way hash value of the data 124, 126 that was retrieved from the data store 122, and/or an ECC (e.g., Hamming ECC) calculated for the retrieved data 124, 126.

In some examples, the data store 122 includes automatic "read" triggers that detect that the data 118 has been read and then write the reading event in the digital distributed ledger 102, thus providing for additional recorded confirmation of reads of the data 118 in the data transfer chain 104. For example, the data store 122 will add a data transmission record to the digital distributed ledger 102 a date of access to the stored data 118, a time of sending the data (e.g., to the applications F 110, G 112), a unique identifier that identifies the data store 122, data store name and version, and/or user(s) receiving the data. The data transmission record also can include a one-way hash value of the data that was transmitted by the read trigger, and/or an ECC (e.g., Hamming ECC) calculated for the transmitted data, thus additionally adding another record of the data transfer chain 104 to the digital distributed ledger 102.

Application F 110 process the data 118 to produce the data 124, which is then transmitted via an API 132. For example, application I 130 can expose an API that provides for one or more data inputs as part of a function call, a class method, a runtime call, and so on. Accordingly, the data 124 is transferred via the API 132 and further processed by the application H 128. The application F 110 interacts with the API 132 to communicate the data 124 and additionally records, via a data transmission record stored in the digital distributed ledger 102, that the API 132 was used to transfer the data 124. For example, the application F 110 creates a data transmission record that includes a date of transmission of the data 124 via the API 132, a time of transmission of the data 124, user(s) receiving the data 124, a unique identifier that identifies the receiving application (e.g., application H 128) receiving the data, the receiving application name and version, organization that is using the receiving application, a unique identifier that identifies the sending application (e.g., application F 110) transmitting the data, the sending application name and version, a unique identifier for the API 132, a name and version for the API 132, organization that is using the API 132, or a combination thereof, and stores the data transmission record in the digital distributed ledger 102. The data transmission record also can include a one-way hash value of the data that was transmitted via the API 132, and/or an ECC (e.g., Hamming ECC) calculated for the transmitted data, thus additionally adding another record of the data transfer chain 104 to the digital distributed ledger 102.

Likewise, the application H 128 processes the data 124 as input and records the reading of the data 124 in the digital distributed ledger 102 via a data receipt record stored in the digital distributed ledger 102. For example, the application H 128 records in the data receipt record a date of receipt of the data via the API 132, a time of receipt of the data, user(s) receiving the data, a unique identifier that identifies the receiving application (e.g., application H 128) receiving the data, the receiving application name and version, a unique identifier that identifies the sending application (e.g., application F 110) transmitting the data, the sending application name and version, a unique identifier that identifies the API 132, a name and version of the API 132, and organization using the API 132, or a combination thereof. The data receipt record also can include a one-way hash value of the data that was received via the API 132, and/or an ECC (e.g., Hamming ECC) calculated for the received data. In certain examples, the digital distributed ledger 102 is additionally used to store a copy of the data communicated via the API 132, which may be encrypted when stored in the digital distributed ledger 102, for added security and anonymization purposes.

Application G 112 also retrieves data 118 from the data store 122 and creates the data 126 as a file. In the depicted example, the application G 112 then communicates the file 126 via the file communications system 116 (which can include using email for communicating the file 126) mentioned earlier. The application G 112 and/or the file communications system 116 create a data transmission record stored in the digital distributed ledger 102 after the file 126 is transmitted. As mentioned above, the data transmission record includes a date of transmission of the file 126, a time of transmission of the file 126, a unique identifier for a user transmitting the file 126, a unique identifier that identifies the application transmitting the file (e.g., application G 112), the transmitting application name and version, organization that is using the transmitting application, any intended recipients (e.g, entities, users, and/or applications), or a combination thereof. The data transmission record also can include a one-way hash value of the file 126 that was transmitted, and/or an ECC (e.g., Hamming ECC) calculated for the transmitted file 126.

The application I 130, upon receipt of the file 126, will create another data receipt record stored the digital distributed ledger 102. For example, the application I 130 will record a date of receipt of the file 126, a time of receipt of the file 126, user(s) receiving the file 126, a unique identifier that identifies the receiving application (e.g., application I 130), the receiving application name and version, an organization that is using the receiving application, or a combination thereof. The data receipt record also can include a one-way hash value of the file 126 that was received, and/or an ECC (e.g., Hamming ECC) calculated for the received file 126, thus additionally adding another record of the data transfer chain 104 to the digital distributed ledger 102. In certain examples, the digital distributed ledger 102 is additionally used to store a copy of the file 126, which may be encrypted when stored in the digital distributed ledger 102, for added security and anonymization purposes.

In the depicted example, multiple nodes 134 are shown operatively coupled to the digital distributed ledger-based system 100. The nodes 134 include computing systems, e.g., server-based systems, cryptocurrency based systems (e.g., cryptocurrency mining systems), workstations, laptops, tablets, notebooks, and so on, that can interact with the digital distributed ledger 102, for example, to add data, read data, create new blocks in the digital distributed ledger 102, and so on. The nodes 134 are communicatively connected to each other via a peer-to-peer network 136. The nodes 134 may also host any one or more applications, such as the applications A 106, B 108, F 110, G 112, H 128, I 130.

The digital distributed ledger 102 provides for a centralized mode of operations, a decentralized mode of operations, and/or a hybrid mode of operations. In the centralized mode of operations, a ledger authority 138 is provided. The ledger authority 138 copies the digital distributed ledger 102, for example, to provide for a master copy of the digital distributed ledger 102 to the nodes 134, to distribute the master copy to the nodes 134, to synchronize between node copies of the digital distributed ledger 102, and so on.

The centralized mode of operations additionally includes a verification authority 140. For example, the verification authority 140 can verify the identify of certain users or applications (e.g., applications A 106, B 108, F 110, G 112, H 128, I 130) via digital certificates (e.g, using cryptographic key pair authentication). In one example, each data transmission record and data receipt record written into the digital distributed ledger 102 includes encrypted identity verification information (e.g., using a public key of a user and/or application and a private key of the verification authority 140), thus adding secure verification of the entity (e.g., user and/or application) that created the data transmission record and the data receipt record. In the centralized mode of operations both the ledger authority 138 and the verification authority 140 are part of the same organization, such as a financial entity (e.g., bank, insurance company, brokerage company, and the like).

A hybrid mode of operations can include the user of the ledger authority 138 for backup purposes only. That is, the ledger authority 138 is no longer in charge of distributing a master copy of the digital distributed ledger 102 but instead participates as another node 134, keeping a copy of the digital distributed ledger 102 to use for aiding the nodes 134 in keeping synchronization among each other. In the hybrid mode of operations the verification authority 140 may be a third party certificate authority not associated with the ledger authority 138 or may not be used.

In a decentralized mode of operations the ledger authority 138 is not used. However, in some examples, the verification authority 140 may still be used as a third party certificate authority. In other decentralized examples, the verification authority 140 is not used. Decentralized verification techniques such as decentralized identifiers (DIDs), can be used that use public key infrastructure (PKI) and attestation techniques, such as Ethereum's decentralized identity, to provide for verification of identities (e.g., user identities, application identities). By providing for a centralized mode of operations, a decentralized mode of operations, and/or a hybrid mode of operations, the techniques described herein provide for enhanced flexibility of use and improved security of operations.

As mentioned earlier, the digital distributed ledger 102 includes a blockchain suitable for storing the data transmission records and the data receipt records, among other users.

Figure 2:
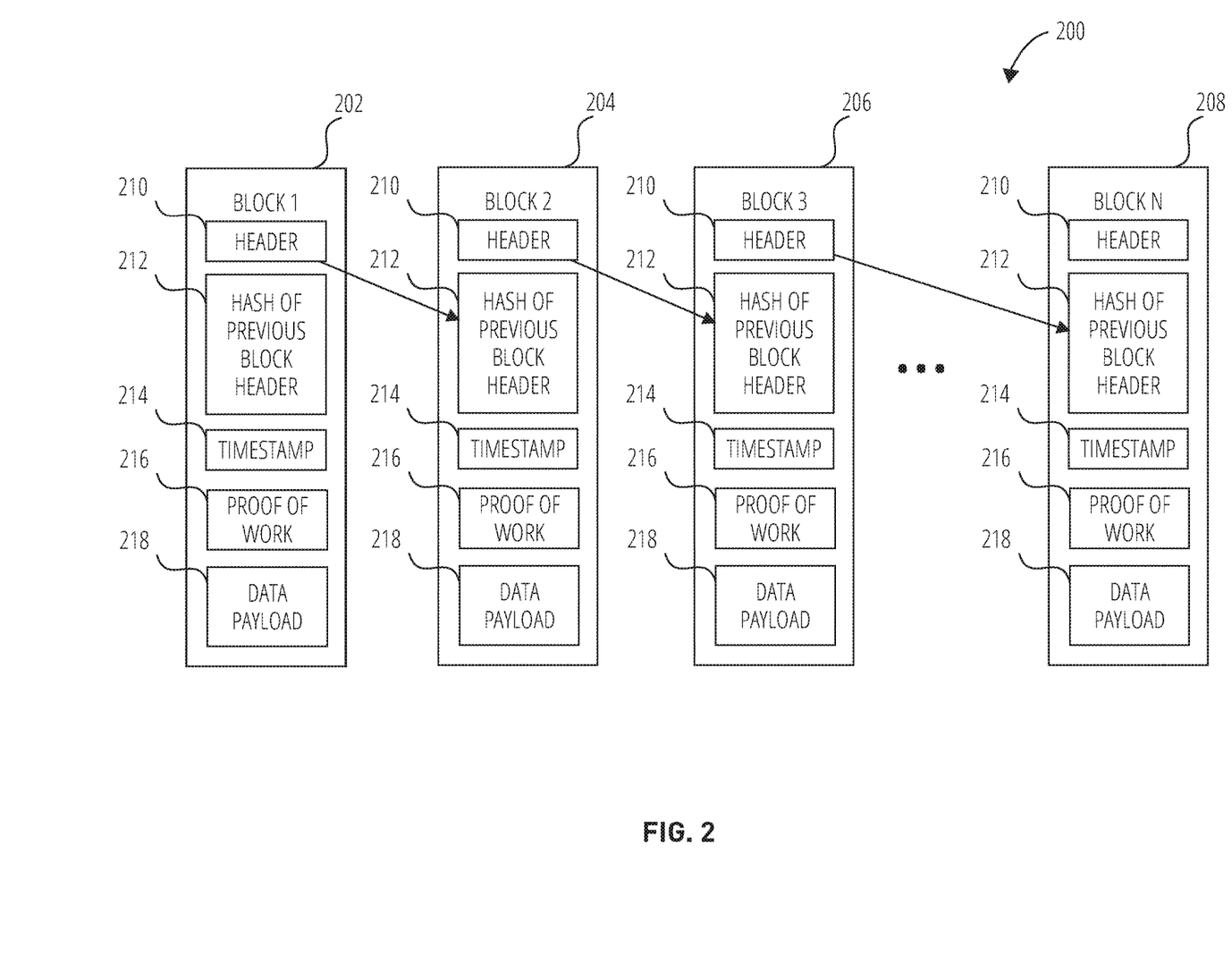
FIG. 2 is a block diagram depicting an embodiment of a blockchain included in the digital distributed ledger of FIG. 1, according to some embodiments.

Turning now to FIG. 2, the figure is a block diagram depicting an embodiment of a blockchain 200 included in the digital distributed ledger 102, according to some embodiments. In the depicted example, the blockchain 200 is illustrated as having multiple blocks 202, 204, 206, 208. The block 202 (first block in the blockchain 200) may have been created, for example, and allocated as a special starting block. The block 202 may include a unique header 210 uniquely identifying the block 202 from other blocks in the blockchain 200. Because the block 202 is the first block in the blockchain 200, a hash of previous block header 212 may be set to zero. A timestamp 214 may include the date of creation for the block 202, and a proof of work 216 may include certain "work" that proves that a node 134 (e.g., miner) has performed computations suitable for the creation of the block 202 and/or to verify transactions in the blockchain 200. The proof of work section 216 may vary based on a protocol used to create the blockchain 200. For example, a bitcoin protocol may use a Merkle tree. The Merkle tree may be a tree data structure in which every leaf node is labelled with a hash (e.g., one-way hash) of a data block and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from our verified blockchain 200, and so on, down the tree. In other words, preventing the creation of a fake value that would hash to our expected Merkle tree value (e.g., value stored in section 216 of the block 202), thus creating a single value that proves the integrity of all of the transactions under it.

Data, such as records included in the digital distributed ledger 102 may be stored in a section 218 (and/or in another section). In certain embodiments, a new block may be created when a new data transmission record and/or data receipt record is to be created. For example, transmitting a certain file may result in the creation of a new block in the blockchain, which may be tied in via block ID to existing block(s). In another embodiment, empty blocks may be first created and then assigned to new blocks as new information (e.g., data transmission records and/or data receipt records) comes in. When a new block is created, the block will receive a new header 210 uniquely identifying the new block. A peer-to-peer network may include multiple nodes 134 (e.g., computing devices used by various entities) that add blocks to the blockchain 200 based on the blockchain protocol. In general, multiple nodes 134 validate transactions or data that are to be added to a block, and compete (e.g., perform computing work, as introduced above) to have their respective block added to the blockchain 200. Validation of transactions and/or data includes verifying digital signatures associated with respective transactions and/or data. For a block to be added to the blockchain 200, a node 134 must demonstrate a proof of work before their proposed block of transactions is accepted by the peer-to-peer network, and before the block is added to the blockchain 200. In certain embodiments, a blockchain protocol include a proof of work scheme (e.g., Merkle Tree) that is based on a cryptographic hash function (CHF). An example CHF includes SHA256. In general, the CHF receives information as input, and provides a hash value as output, the hash value being of a predetermined length. For example, SHA256 outputs a 256-bit (32-byte, 64-character) hash value. In some examples, the hash value is a one-way hash value such that the output hash value cannot be 'un-hashed' to determine what the input was. The blockchain protocol can require multiple pieces of information as input to the CHF. For example, the input to the CHF can include a reference to the previous (most recent) block (e.g., hash 212) in the blockchain 200, details of the transaction(s) or data that are to be included in the to-be-created block, and a "nonce" value (e.g., a random number used only once).

Multiple nodes 134 may compete to hash a set of transactions and to provide the next block that is to be added to the blockchain 200. The blockchain protocol provides a threshold hash to qualify a block to be added to the blockchain 200. For example, the threshold hash can include a predefined number of zeros (0's) that the hash value must have at the beginning (e.g., at least the first four characters of the hash value must each be zero). The higher the number of zeros, the more computationally time-consuming it may be to arrive at a qualifying hash value.

In accordance with the blockchain protocol, each node 134 in the node's peer-to-peer network receives transaction information for one or more transactions that are to be included in a block that is to be added next in the blockchain 200. Each node 134 provides the reference to the previous (most recent) block in the blockchain 200, details of the data or transaction(s) that are to be included in the to-be-created block (e.g., data receipt record and/or data transmission record), and the nonce value to the CHF that may then be used to provide a hash value. If the hash value does not meet the threshold hash (e.g., the first four characters of the hash value are not each zero), the node 134 starts again to provide another hash value, thus increasing the amount of work. If the hash value meets the threshold hash (e.g., at least the first four characters of the hash value are each zero), the respective node 134 may have successfully created the next block that is to be added to the blockchain 200. Consequently, the respective node's block is broadcast across the peer-to-peer network (e.g., all devices communicatively coupled to the digital distributed ledger-based system 100). All other nodes 134 cease work (because one node 134 was already successful), and all copies of the blockchain 200 are updated across the peer-to-peer network to append the block to the blockchain 200. Each node 134 may produce hundreds of thousands (or more) of hash values, before any one node 134 provides a qualifying hash value (e.g., at least the first four characters of the hash value are each zero).

It is to be noted that any computing device, such as desktop computers, laptops, tables, mobile phones, other mobile devices, and so on, may be used for creating the blocks in the blockchain 200. Accordingly, as new information for is created, new blocks may be added to the blockchain 200, including blocks 202, 204, 206, and 208. Indeed, the blockchain 200 may continue to grow, storing new records for information related to the data transfer chain 104. Because of the distributed nature of the peer-to-peer network created via the digital distributed ledger-based system 100, each node 134 may include copies of the blockchain 200 and share copies of the blockchain 200 as new peers enter the peer-to-peer network. Each copy of the blockchain 200 may include authenticate and/or encrypted information (e.g., verification information for users and/or applications) for all or substantially all of the information tracked by the digital distributed ledger system 100. The information is immutable, and more efficiently tracked as new information gets added via the digital distributed ledger-based system 100. Accordingly, logs, relationships, transactions, or other information pertaining to the data transfer chain 104 may be captured, as shown in FIG. 3.

Figure 3:
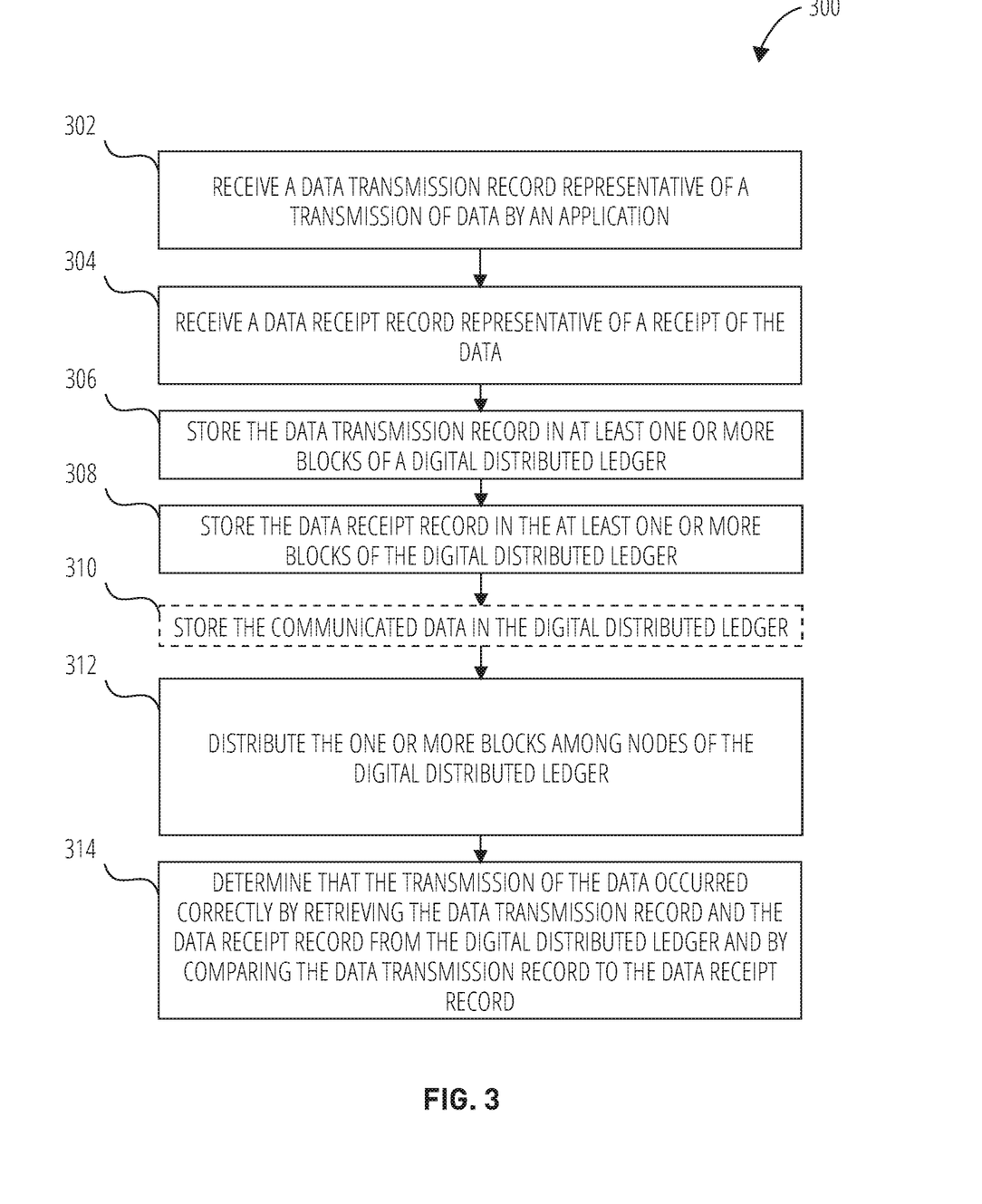
FIG. 3 is a flowchart of a process for capturing and using data transmission records and data receipt records for the data transfer chain of FIG. 1, according to some embodiments.

FIG. 3 is a flowchart of a process 300 for capturing and using data transmission records and data receipt records for the data transfer chain 104, according to some embodiments. In the depicted example, the process 300 receives, at step 302, a data transmission record representative of a transmission of data by an application. As mentioned earlier, the data transmission record is representative of transmission of data via a file, transmission of data via an API, or transmission of data via a data store.

When the data transmission record is used to record file transmissions, the data transmission record includes a date of file transmission, a time of file transmission, a unique identifier for a user transmitting the file, a unique identifier that identifies the application used for transmission (e.g., application A 106), the transmitting application name and version, an organization that is using the transmitting application, any intended recipients (e.g, entities, users, and/or other applications), or a combination thereof. In some examples, a one-way hash function, such as MD5, SHA1, SHA256, and so on, is applied to the data transmitted (e.g., the file) to produce a one-way hash value (e.g., 32 character-long value, 64 character-long value, and so on). The one-way hash value thus identifies the data transmitted. Accordingly, the hash value is stored as part of the data transmission record. Further, in some examples, an error correction code (ECC), such as a Hamming ECC, is computed for the data transmitted and stored in the data transmission record. The ECC can then be used to correct data transmission errors and/or to verify that data transmission took place.

Likewise, when the data transmission record is used to record data transmissions via an API, the data transmission record includes a date of transmission of the data, a time of transmission of the data, user(s) transmitting the file, a unique identifier that identifies the receiving application (e.g., application H 128) receiving the data, the receiving application name and version, a unique identifier that identifies the sending application (e.g., application F 110) transmitting the data, the sending application name and version, a unique identifier that identifies the API, the API name and version, an organization that is using the API, or a combination thereof. The data transmission record also includes a one-way hash value of the data that was transmitted via the API, and/or an ECC (e.g., Hamming ECC) calculated for the transmitted data. When the data transmission record is used to record data transmissions to a data store, the data transmission record includes a date of storage of the data, a time of storage for the data, a unique identifier for a user storing the data, a unique identifier that identifies the application storing the data in the data store (e.g., application B 108), application name and version, organization that is using the application, any intended recipients (e.g, entities, users, and/or applications), or a combination thereof. In some examples, the data transmission record additionally includes a one-way hash value of the data that was transmitted into the data store, and/or an ECC (e.g., Hamming ECC) calculated for the transmitted data.

The process 300 then receives, at step 304, a data receipt record representative of a receipt of the data by an application. When the data receipt record is based on receipt of a file, the data receipt record includes a date of receipt of the file, a time of receipt of the file, user(s) receiving the file, a unique identifier that identifies the application receiving the file (e.g., application B 108), the receiving application name and version, and organization that is using the receiving application, or a combination thereof. In some examples, the data receipt record additionally includes a one-way hash value of the file that was received, and/or an ECC (e.g., Hamming ECC) calculated for the received file.

If the data receipt record is based on receipt of data via an API, the data receipt record includes a date of receipt of the data, a time of receipt of the data, user(s) receiving the data, a unique identifier that identifies the receiving application (e.g., application H 128) receiving the data, the receiving application name and version, organization that is using the receiving application, a unique identifier that identifies the sending application (e.g., application F 110) transmitting the data, the sending application name and version, a unique identifier that identifies the API, the API name and version, an organization that is using the API, or a combination thereof. The data receipt record also can include a one-way hash value of the data that was received via the API, and/or an ECC (e.g., Hamming ECC) calculated for the received data.

If the data receipt record is based on a data store receiving the data, the data receipt record includes a date of storage, a time of storage, a unique identifier that identifies the data store being used, the data store name and version, organization that is using the data store, user account used to write to the data store, or a combination thereof. In some examples, the data receipt record additionally includes a one-way hash value of the data that was received by the data store, and/or an ECC (e.g., Hamming ECC) calculated for the received data.

The process 300 then stores, at step 306 the data transmission record in at least one or more blocks of the digital distributed ledger 102. For example, a new block of the blockchain 200 is used, and the data payload 218 section of a block of the blockchain 200 then stores the data transmission record. The process 300 additionally stores, at step 308, the data receipt record. for example, a new block of the blockchain 200 is used, and the data payload 218 section of a block of the blockchain 200 then stores the data receipt record. In some embodiments, the process 300 also stores, at step 310, the data that was communicated. For example, data transmitted and/or data received can be stored in one or more data payload 218 sections of one or more block of the blockchain 200.

The new blocks used to store the data transmission record and the data receipt record are then distributed, at step 312, among the various nodes (e.g., nodes 134) of the digital distributed ledger 102. That is, the new blocks storing the data transmission record and the data receipt record are then used to update the various copies of the blockchain 200 across the peer-to-peer network 136 to append the new blocks to the blockchain 200 at each node 134. The data transmission record and the data receipt record are now stored in an immutable manner, with verifiable and traceable data lineage.

In one example, the process 300 can then verify that a data transmission has occurred correctly. For example, the process 300, at step 314, can determine that the transmission of data has occurred correctly via a comparison of the data transmission record and the data receipt record stored in the digital distributed ledger 102. To do so, the process 300 retrieves the stored data receipt record and data transmission record from the digital distributed ledger 102 and compares the certain information in the data transmission record and the data receipt record. In one example, the comparison uses the one-way hash value of the data transmission record to compare to the one-way hash value of the data receipt record. If the one-way hash values are equal then the data sent and received is the same, and the data transmission has occurred without errors. In another example where the transmitted data and the received data where both stored in the digital distributed ledger 102, the transmitted data can be compared to the received data to determine that that the transmission of data occurred correctly.

The data transmission record includes the ECC for the transmitted data. Likewise, the data receipt record includes the ECC for the received data. In one example, if the ECCs in the data transmission record and in the data receipt record do not match, then the transmitted data is not correct. The ECCs can be used for error correction. For example, the ECCs can be used, based on the Hamming distance, to decode a data correction. Data lineage verification is also provided by the techniques described herein. For example, the data transmission record and the data receipt record include identification information, either via the verification authority 140 or via DIDs, for the application and/or users transmitting and receiving the data. Accordingly, a timeline of where the data came from and who provided the data can be produced. Because of the decentralized access provided by the digital distributed ledger 102, applications, (e.g., applications A 106, B 108, F 110, G 112, H 128, I 130), nodes 134 and/or authorities 138, 140, can use the digital distributed ledger 102 to compare data transmission records to data receipts records, correct erroneous data, produce the data lineage verification, produce a verified timeline of data provenance, and so on. Indeed, any entity that can access the digital distributed ledger 102 is now able to verify data transmissions, correct erroneous data, produce the data lineage verification, and/or produce a verified timeline of data provenance.

Figure 4:
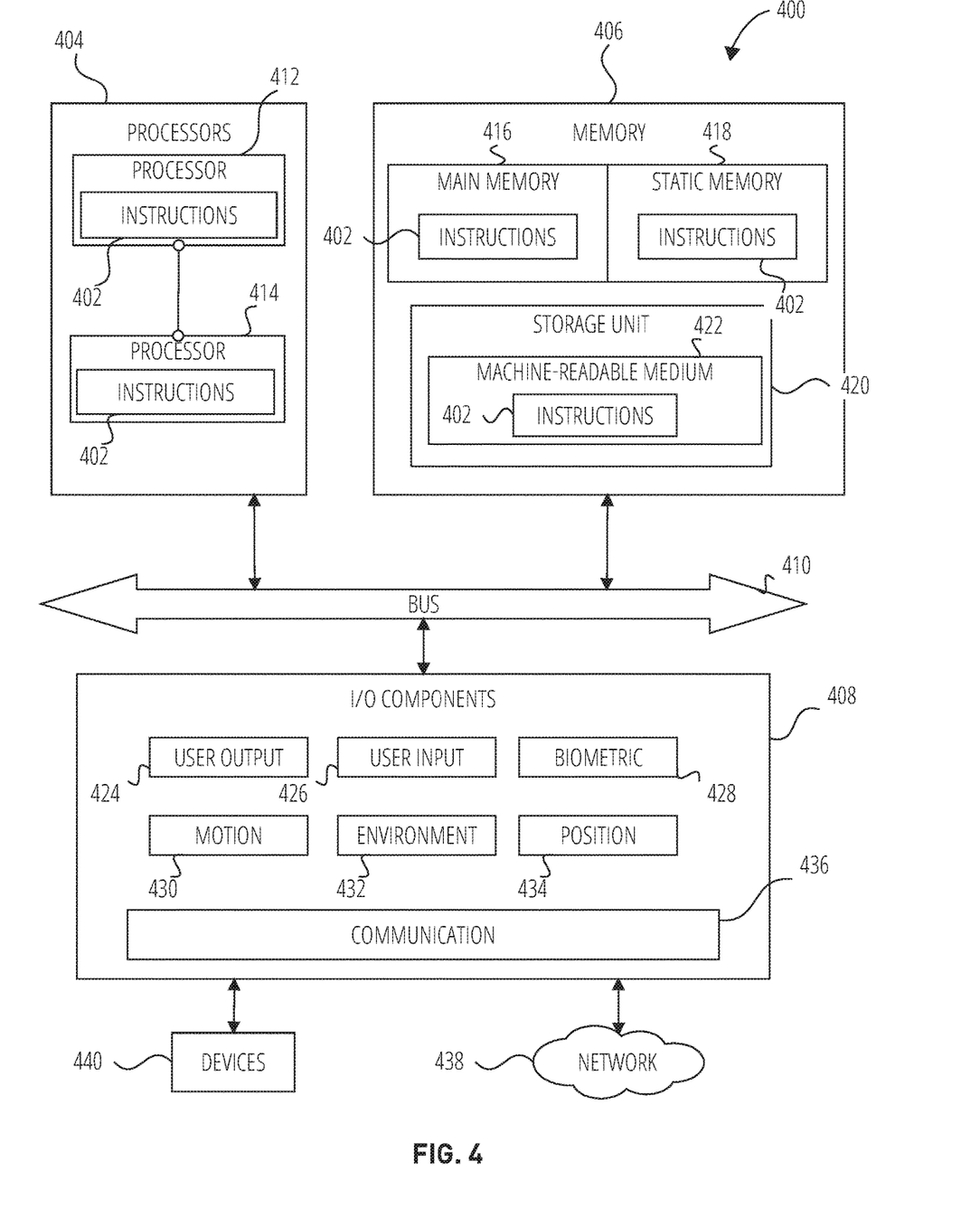
FIG. 4 is a block diagram depicting a machine suitable for executing instructions via one or more processors, according to some embodiments.

FIG. 4 is a diagrammatic representation of a machine 400 within which instructions 402 (e.g., software, a program, an application, an applet, an app, or other executable code) for causing the machine 400 to perform any one or more of the methodologies discussed herein may be executed. For example, the instructions 402 may cause the machine 400 to execute any one or more of the processes or methods described herein, such as the process 300. The instructions 402 transform the general, non-programmed machine 400 into a particular machine 400, e.g., the digital distributed ledger-based system 100, programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 402, sequentially or otherwise, that specify actions to be taken by the machine 400. Further, while a single machine 400 is illustrated, the term "machine" shall also be taken to include a collection of machines that individually or jointly execute the instructions 402 to perform any one or more of the methodologies discussed herein. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 408, which may be configured to communicate with each other via a bus 410. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 412 and a processor 414 that execute the instructions 402. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 416, a static memory 418, and a storage unit 420, both accessible to the processors 404 via the bus 410. The main memory 416, the static memory 418, and storage unit 420 store the instructions 402 embodying any one or more of the methodologies or functions described herein. The instructions 402 may also reside, completely or partially, within the main memory 416, within the static memory 418, within machine-readable medium 422 within the storage unit 420, within at least one of the processors 404 (e.g., within the processor's cache memory), or any suitable combination thereof, during execution thereof by the machine 400.

The I/O components 408 may include a wide variety of components to receive input, provide output, produce output, transmit information, exchange information, capture measurements, and so on. The specific I/O components 408 that are included in a particular machine will depend on the type of machine. For example, portable machines such as mobile phones may include a touch input device or other such input mechanisms, while a headless server machine will likely not include such a touch input device. It will be appreciated that the I/O components 408 may include many other components that are not shown in FIG. 4. In various examples, the I/O components 408 may include user output components 424 and user input components 426. The user output components 424 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 426 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 408 may include biometric components 428, motion components 430, environmental components 432, or position components 434, among a wide array of other components. For example, the biometric components 428 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 430 include acceleration sensor components (e.g., accelerometer), gravitation sensor components, rotation sensor components (e.g., gyroscope).

The environmental components 432 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 434 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 408 further include communication components 436 operable to couple the machine 1200 to a network 438 or devices 440 via respective coupling or connections. For example, the communication components 436 may include a network interface component or another suitable device to interface with the network 438. In further examples, the communication components 436 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 440 may be another machine or any of a wide variety of peripheral devices (e.g., a peripheral device coupled via a universal serial bus (USB) port), internet-of-things (IoT) devices, and the like.

Moreover, the communication components 436 may detect identifiers or include components operable to detect identifiers. For example, the communication components 436 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 436, such as location via Internet Protocol (IP) geolocation, location via Wi-Fi® signal triangulation, location via detecting an NFC beacon signal that may indicate a particular location, and so forth.

The various memories (e.g., main memory 416, static memory 418, and memory of the processors 404) and storage unit 420 may store one or more sets of instructions and data structures (e.g., software) embodying or used by any one or more of the methodologies or functions described herein. These instructions (e.g., the instructions 402), when executed by processors 404, cause various operations to implement the disclosed examples.

The instructions 402 may be transmitted or received over the network 438, using a transmission medium, via a network interface device (e.g., a network interface component included in the communication components 436) and using any one of several well-known transfer protocols (e.g., hypertext transfer protocol (HTTP)). Similarly, the instructions 402 may be transmitted or received using a transmission medium via a coupling (e.g., a peer-to-peer coupling) to the devices 440.

The techniques described herein provide for data communication between applications that includes using a digital distributed ledger to annotate certain data communication events and/or to record certain data transfers. By using the digital distributed ledger as further described below, the techniques described herein enable various types of applications, including disparate applications (e.g., applications that are not explicitly designed to work with each other) to transfer information between each other while a record of data transfers is maintained in an immutable and distributed manner. A data transfer chain is recorded by using data transmission records and data receipt records stored in the digital distributed ledger. The recorded data transfer chain provides an immutable and verifiable record of data transactions that have occurred for applications that participated in the chain.

What is claimed is:

1. A digital distributed ledger-based system comprising:
one or more hardware processors; and
at least one memory storing instructions that cause the one or more hardware processors to perform operations comprising:
receiving, via a first application, a first data transmission record representative of a transmission of a file by the first application to a second application, wherein the first application and the second application are in communication with each other;
receiving, via the second application, a first data receipt record representative of a receipt of the file by the second application after the second application receives the file from the first application;
storing the first data transmission record in at least one or more blocks of a digital distributed ledger;
storing the first data receipt record in the at least one or more blocks of the digital distributed ledger;
distributing the one or more blocks among nodes communicatively coupled to the digital distributed ledger, wherein the digital distributed ledger is configured to immutably store the first data transmission record and the first data receipt record; and
determining that the transmission of the file has occurred correctly by retrieving the first data transmission record and the first data receipt record from the digital distributed ledger and by comparing the first data transmission record to the first data receipt record.

2. The digital distributed ledger-based system of claim 1, wherein comparing the first data transmission record to the first data receipt record comprises comparing a data transmitted one-way hash value included in the first data transmission record to a data received one-way hash value included in the first data receipt record to determine that the transmission of the file has occurred correctly.

3. The digital distributed ledger-based system of claim 1, wherein the operations comprise detecting that a data transmission error has occurred by comparing a first error correction code (ECC) included in the first data transmission record to a second ECC included in the first data receipt record.

4. The digital distributed ledger-based system of claim 3, wherein the operations comprise correcting the data transmission error by applying the first ECC or the second ECC to the received file.

5. The digital distributed ledger-based system of claim 1, wherein the operations comprise:
encrypting the file;
storing the encrypted file in the at least one or more blocks of the digital distributed ledger; and
providing a backup of the file via the encrypted file stored in the at least one or more blocks of the digital distributed ledger.

6. The digital distributed ledger-based system of claim 1, wherein the operations comprise:
receiving, via a third application, a second data transmission record representative of a transmission of a data via an application programming interface (API) used by the third application;
receiving, via a fourth application, a second data receipt record representative of a receipt of the data by the fourth application;
storing the second data transmission record in the at least one or more blocks of a digital distributed ledger;
storing the second data receipt record in the at least one or more blocks of the digital distributed ledger; and
determining that the transmission of the data has occurred correctly by retrieving the second data transmission record and the second data receipt record from the digital distributed ledger and by comparing the second data transmission record to the second data receipt record, wherein the digital distributed ledger is configured to immutably store the second data transmission record and the second data receipt record.

7. The digital distributed ledger-based system of claim 6, wherein the API is provided by the fourth application, by a cloud-based system, by a messaging system, or a combination thereof.

8. The digital distributed ledger-based system of claim 1, wherein the operations comprise:
receiving, via a fifth application, a third data transmission record representative of a storing of a second data into a data store;
receiving, via the data store, a third data receipt record representative of a receipt of the second data by the data store;
storing the third data transmission record in the at least one or more blocks of a digital distributed ledger;
storing the third data receipt record in the at least one or more blocks of the digital distributed ledger; and
determining that the transmission of the data has occurred correctly by retrieving the third data transmission record and the third data receipt record from the digital distributed ledger and by comparing the third data transmission record to the third data receipt record, wherein the digital distributed ledger is configured to immutably store the third data transmission record and the third data receipt record.

9. The digital distributed ledger-based system of claim 8, wherein the data store comprises a relational database, a NoSQL database, an object-oriented database system, a cloud-based database system, or a combination thereof.

10. The digital distributed ledger-based system of claim 8, wherein receiving, via the data store, the third data receipt record comprises using a data store trigger to automatically generate the third data receipt record and to store the third data receipt record in the at least one or more blocks of a digital distributed ledger.

11. The digital distributed ledger-based system of claim 1, wherein the operations comprise providing a decentralized mode of operations, a centralized mode of operations, a hybrid mode of operations, or a combination thereof, via the digital distributed ledger.

12. The digital distributed ledger-based system of claim 11, wherein providing the hybrid mode of operations comprises providing for a ledger authority configured to store a backup copy of the digital distributed ledger.

13. The digital distributed ledger-based system of claim 11, wherein providing the centralized mode of operations comprises providing for a ledger authority configured to store a master copy of the digital distributed ledger and to use the master copy to synchronize the digital distributed ledger among the nodes.

14. The digital distributed ledger-based system of claim 13, wherein providing the centralized mode of operations comprises providing for a verification authority configured to verify a first identity of the first application and a second identify of the second application.

15. The digital distributed ledger-based system of claim 14, wherein the verification authority is configured to verify the first identity and the second identity by using digital certificates.

16. The digital distributed ledger-based system of claim 11, wherein providing the decentralized mode of operations comprises using decentralized identifiers for verifying a first identity of the first application and a second identify of the second application.

17. A non-transitory machine-readable medium storing instructions that, when executed by a computer system, cause the computer system to perform operations comprising:
receiving, via a first application, a first data transmission record representative of a transmission of a file by the first application to a second application, wherein the first application and the second application are in communication with each other;
receiving, via the second application, a first data receipt record representative of a receipt of the file by the second application after the second application receives the file from the first application;
storing the first data transmission record in at least one or more blocks of a digital distributed ledger;
storing the first data receipt record in the at least one or more blocks of the digital distributed ledger;
distributing the one or more blocks among nodes of the digital distributed ledger, wherein the digital distributed ledger is configured to immutably store the first data transmission record and the first data receipt record; and
determining that the transmission of the file has occurred by retrieving the first data transmission record and the first data receipt record from the digital distributed ledger and by comparing the first data transmission record to the first data receipt record.

18. The non-transitory machine-readable medium of claim 17, wherein the operations comprise:
encrypting the file;
storing the encrypted file in the at least one or more blocks of the digital distributed ledger; and
providing a backup of the file via the encrypted file stored in the at least one or more blocks of the digital distributed ledger.

19. A method comprising:
receiving, via a first application, a first data transmission record representative of a transmission of a file by the first application to a second application, wherein the first application and the second application are in communication with each other;
receiving, via the second application, a first data receipt record representative of a receipt of the file by the second application after the second application receives the file from the first application;
storing the first data transmission record in at least one or more blocks of a digital distributed ledger;
storing the first data receipt record in the at least one or more blocks of the digital distributed ledger;
distributing the one or more blocks among nodes of the digital distributed ledger, wherein the digital distributed ledger is configured to immutably store the first data transmission record and the first data receipt record; and
determining that the transmission of the file occurred by retrieving the first data transmission record and the first data receipt record from the digital distributed ledger and by comparing the first data transmission record to the first data receipt record.

20. The method of claim 19, comprising:
encrypting the file;
storing the encrypted file in the at least one or more blocks of the digital distributed ledger; and
providing a backup of the file via the encrypted file stored in the at least one or more blocks of the digital distributed ledger.

* * * * *

UNITED STATES PATENT AND TRADEMARK OFFICE
CERTIFICATE OF CORRECTION

PATENT NO. : 12,254,000 B2
APPLICATION NO. : 18/192184
DATED : March 18, 2025
INVENTOR(S) : Bhattacharya et al.

It is certified that error appears in the above-identified patent and that said Letters Patent is hereby corrected as shown below:

On the Title Page

Item (72), in "Inventors", in Column 1, Line 1, delete "Changannagar" and insert --Chandannagar-- therefor In the Claims In Column 15, Line 51, in Claim 1, after "in", insert --the--

In Column 17, Line 48, in Claim 17, delete "other:" and insert --other;-- therefor In Column 17, Line 53, in Claim 17, after "in", insert --the--

In Column 18, Line 32, in Claim 19, after "in", insert --the--

Signed and Sealed this
Eighth Day of July, 2025

Coke Morgan Stewart
*Acting Director of the United States Patent and Trademark Office*